Sept. 20, 1960   J. R. HEDGER   2,953,114
WARNING DEVICE FOR ROADSIDE USE
Filed Nov. 7, 1958   2 Sheets-Sheet 1
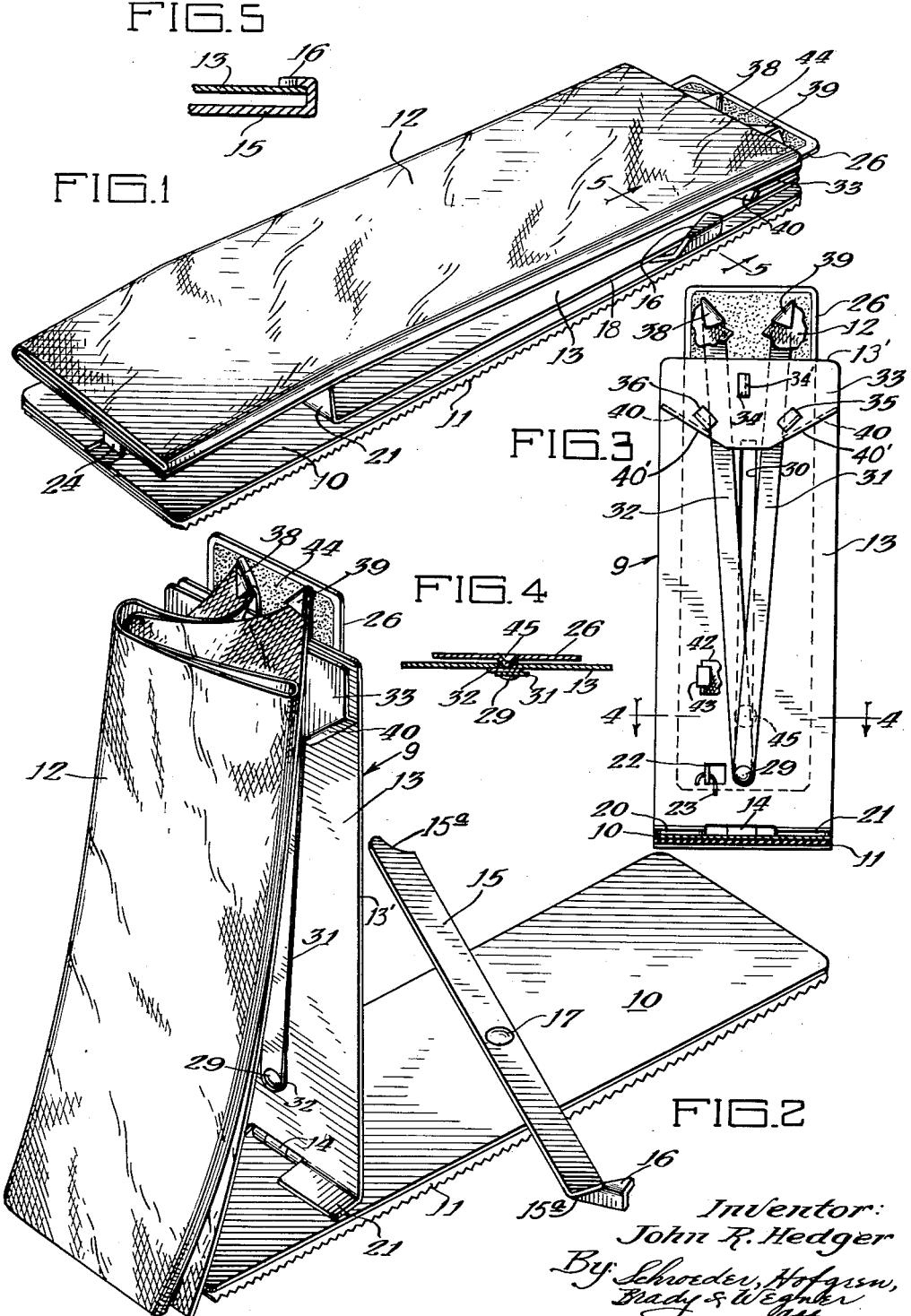

Sept. 20, 1960  J. R. HEDGER  2,953,114
WARNING DEVICE FOR ROADSIDE USE
Filed Nov. 7, 1958  2 Sheets-Sheet 2
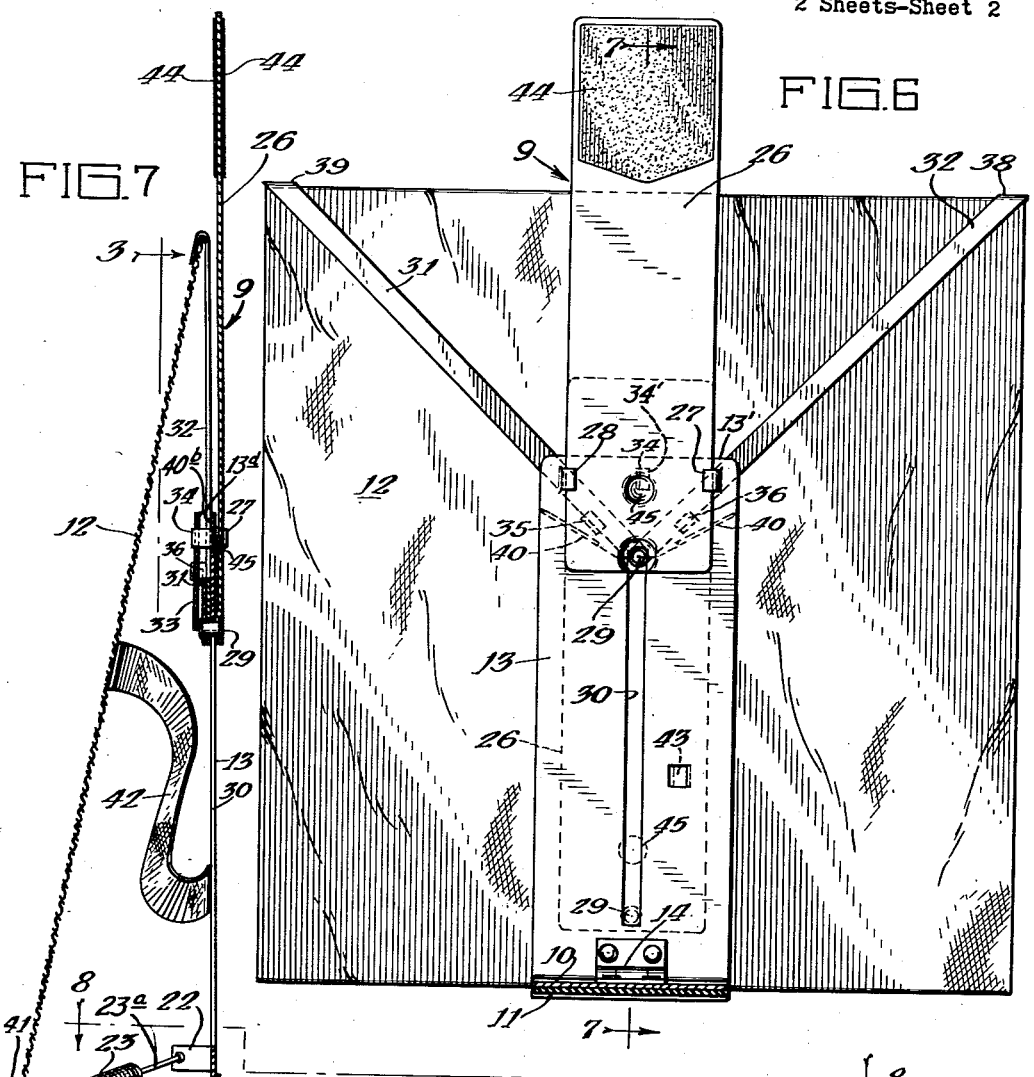
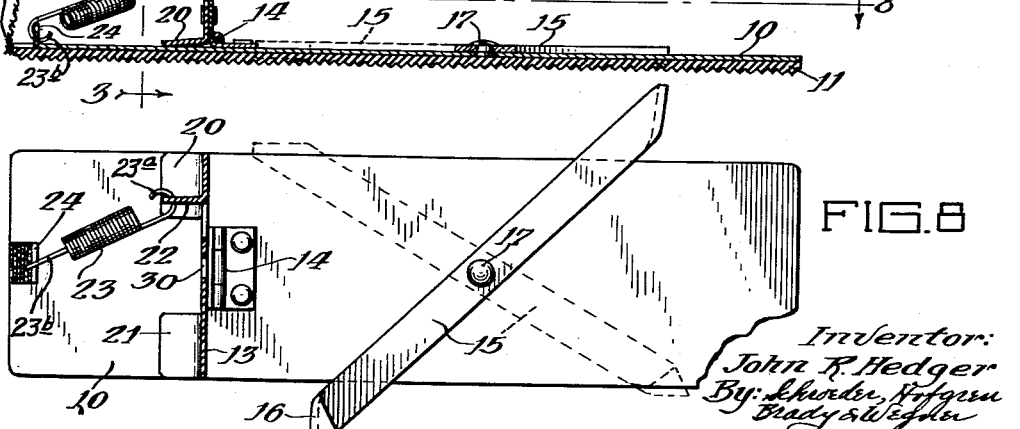

United States Patent Office 2,953,114
Patented Sept. 20, 1960

2,953,114

WARNING DEVICE FOR ROADSIDE USE

John R. Hedger, 1219 N. Clinton St., Decatur, Ill.

Filed Nov. 7, 1958, Ser. No. 772,444

7 Claims. (Cl. 116—63)

This invention relates to a warning device for roadside use and more particularly to a flag carrying warning stand that can be placed at roadside to warn approaching motorists of danger ahead. The device is of the type which may be carried conveniently in an automobile or truck and set out when stopping for emergency repairs, tire changing or similar roadside activities.

Generally, the device employs a flag supported in an unfurled position so as to be visible to oncoming traffic. In the past, such structures have been found deficient because the gusts of wind or a down-draft of passing vehicles would blow the devices over or knock them down. The down-draft from passing large trucks is particularly apt to blow over or upset any device which is simply set out on the highway or the shoulder beside pavement. The device of the present invention solves this problem.

It is therefore the primary object of this invention to provide a new and improved warning device for roadside use.

Another object is to provide such a device having an upright standard for holding a flag so constructed that the draft of passing vehicles may lower the flag after which it will automatically return to upright visible position.

Another object is to provide such a device which may be easily and readily folded into a compact form for carrying storage and quite as easily and readily prepared for roadside use.

A further object is to provide a roadside warning device which may be easily manufactured at relatively low cost and having parts not subject to damage or wear from use.

Other objects, features and advantages of the present invention will be apparent from the following description of a preferred embodiment illustrated in the accompanying drawings, in which:

Figure 1 is a perspective view of the device in its folded position ready for storage;

Figure 2 is a perspective view of the device when partially unfolded toward position for use;

Figure 3 is a fragmentary sectional view looking toward the standard substantially along line 3—3 in Figure 7 but with the standard in collapsed position and showing only a portion of the flag number;

Figure 4 is an enlarged fragmentary sectional view horizontally through the standard taken substantially along line 4—4 in Figure 3;

Figure 5 is an enlarged fragmentary sectional view through the locking means for holding the device in folded position taken substantially along line 5—5 in Figure 1;

Figure 6 is a reduced rear elevational view of the device in position to be used and partially in section;

Figure 7 is a vertical sectional view centrally through Figure 6, substantially along line 7—7 therein, and Figure 8 is a horizontal sectional view of the device taken substantially along line 8—8 in Figure 7.

The device of this invention employs a base from which a standard may extend upwardly for the purpose of holding a flag of bright red color so as to be visible from either side. This structure, while being considerably large when unfolded and the flag unfurled, is intended to be folded into a compact form for storage in the trunk of an automobile or the cab of a truck. Referring to Figure 1, the device is shown in its folded position wherein the base plate 10 with its rubber foot covering 11, is at one side of the unit and the flag 12 is at the opposite side. As folded, the device is about a foot long by three inches wide, and not over an inch in thickness between the rubber covered base and the flag 12.

The parts of the device are preferably made from relatively lightweight sheet metal. The base plate 10 extends over most of the length of the device and provides a support for an upright standard 9 hingedly and swingably attached to the base by means of a hinge 14. The upright standard 9 of sheet metal may be retained in folded position against the base 10 by a keeper member 15, having an overlying ear 16 for the purpose of embracing the edge 18 of the upright standard, as shown in Figures 1 and 5. The keeper member is pivoted to the base by means of a rivet 17 so that it may be swung crosswise of the base and have outwardly extending feet 15a which can add lateral stability to the standard base.

The upright standard 9 is formed of two sections. The lower section 13 of sheet metal has a pair of bottom ears 20 and 21 adapted to bear against the upper surface of the base plate 10 when the standard is in its upright position, as shown in Figures 6, 7 and 8. An ear 22 struck out from the metal of the lower section 13 is perforated to receive the end 23a of a coiled tension spring 23 having its other end 23b attached to an upstanding ear 24, struck upwardly from the metal of the base plate 10. The spring is elongated by the swinging of the lower section 13 about its hinge 14 into folded position against the base plate 10. The spring thus urges the standard to its uppermost position. The ear 22 on the lower section is of sufficient length to allow the spring always to have some leverage about the hinge 14. The ears 20 and 21 at the bottom of the lower section limit the upward swinging of the lower section and hold it upright relative to the base when at rest.

The standard is equipped with an upper section 26 also formed of sheet metal but of narrower width than the lower section 13. The upper section 26 is slidably movable lengthwise of the lower section 13, and a pair of ears 27 and 28 struck out from the metal of the lower section 13 form side guides for the upper section 26. Additionally, a rivet 29 passes through the lower portion of the upper section 26 and through an elongated central slot 30 in the lower section 13. This rivet also guides the upper section 26 and, in conjunction with the ears 27 and 28, allows the upper section to move only between the dotted line position, shown in Figure 6, and the full line position.

The flag 12 is supported on the standard 13, 26 by means of a pair of arms 31 and 32. The arms are pivoted at their lower ends on the rivet 29, connecting the two sections of the standard. The arms are held sufficiently loosely so that they may pivot on the rivet 29. Referring particularly to Figure 3, the lower section 13 of the standard is equipped at its upper end 13' with a relatively small auxiliary plate 33 for guiding the arms. The plate 33 is secured in place by a crimped central ear 34 struck out from the lower section 13 and passing through an opening 34' in the plate 33 and a pair of side ears 35 and 36 similarly formed and attached to the plate 33. The arm 31 passes between the ears 34 and 35 and is prevented from swinging perpendicularly to the flat faces of the standard sections 13 and 26 by the small plate 33.

The arm 32 similarly is caused to travel entirely in the space between the ears 34 and 36. In the position of Figure 3, the upper section 26 of the standard is in its lowermost position relative to the lower section 13, and the arms have been folded into a position within the projection of the upper and lower sections 13, 26. This position is also illustrated in Figure 2. When the upper section 26 of the standard is moved vertically relative to the lower section 13 to the position of Figures 6 and 7, the arms swing outwardly and rest on the ears 35 and 36 in their outer position shown. The flag 12 is secured to the outer ends 38 and 39 of the arms, as shown in Figures 2 and 3, the outer ends 38 and 39 being crimped upon the flag material. When the upper and lower sections are telescoped together, the arms are guided to the folded position shown in Figure 3 and thus carries the outer corners of the flag to a central position, as shown in Figure 2. The plate 33 has a spacing flange 40 at either lower edge 40a to provide space between its inner surface 40b and the opposite surface of the lower section 13 so that the arms move freely between the two plates 33 and 13.

When the device is placed in its open usable position, as shown in Figures 6 and 7, the flag is of sufficient extent to have its lower end 41 almost touching the ground at the front of the base. Wind may tend to whip the flag relative to its supporting standard and a narrow strip of material 42 secured to the central portion of the flag and to an ear 43 struck from the lower section 13, will prevent the flag from flipping over the top of the standard. Reflective material 44 may be placed on the upper section 26 and thus be particularly useful at night to reflect the light of oncoming headlights. The tongue or strip of material 42 prevents the flag from covering the reflective material on the top of the standard.

Ordinarily, a motorist may carry several warning devices in his automobile for use in an emergency situation. The device, when folded, requires very little storage space, as in Figure 1. The procedure for unfurling the flag merely requires the initial release of the keeper 15, which will allow the standard to pop-up relative to the base, to the position shown in Figure 2. The sections of the standard are then telescoped and may be pulled to the position of Figure 6 by merely grasping the upper end of the upper section 26 and pulling it upwardly relative to the base. To aid in holding the sections extended, a projection 45 is stamped into the upper section 26 above the rivet 29 and centrally of the section so that it may ride in the slot 30. Near the upper position shown in Figure 6, this projection will ride out of the slot and into the opening 34a left by the forming of the ear 34. The two sheet metal sections are sufficiently close together to utilize some resiliency of the metal, permitting the projection 45 to hold the sections extended. The outwardly extending arms and the weight of the flag thereon also tend to keep the sections extended, however, a downward push on the upper section 26 will readily telescope the sections towards storage position. Once the standard is folded into the position shown in Figure 1, and locked by the keeper 15, the flag may be easily folded on top of the folded parts.

The foregoing detailed description has been given for clearness of understanding only, and no unnecessary limitations should be understood therefrom, for some modifications will be obvious to those skilled in the art.

I claim:

1. A portable signal device comprising: a base member, a standard extending upwardly from said base member, a pair of arms attached to an upper portion of said standard and each arm extending upwardly and outwardly on opposite sides with respect thereto, a flag member having an upper portion attached to the terminal portions of said arms and extending downwardly towards said base member.

2. A portable signal device as specified in claim 1 in which said standard includes a pair of sheet metal elongated sections with a lower section attached to said base member and an upper section slidably supported on said lower section.

3. A portable signal device as specified in claim 1 in which said arms are pivotably attached to said standard and are swingable into superposed relation with said standard and said standard is swingably attached to said base member.

4. A portable signal device as specified in claim 1 in which said standard is swingably attached to said base member for movement between said upwardly extending position and a lower folded position overlying said base member.

5. A portable signal device as specified in claim 1 in which hinge means secures said standard to said base member for swinging movement of the standard away from approaching traffic so that draft of passing vehicles caught by said flag member may forcibly lower the standard and flag member without appreciably moving the base member over the ground and spring means couple the standard and base member to raise the standard after draft of a passing vehicle has subsided.

6. A portable signal device as specified in claim 1 in which the standard includes an elongated lower section and an elongated upper section slidably supported longitudinally on said lower section to extend the over-all length of the standard, said pair of arms are carried at their lower ends only on said upper section and means are provided for folding said arms into superposed relation with the standard when the upper section is slidably moved into superposed relation with said lower section.

7. A portable signal device as specified in claim 6 wherein guide means are provided at the upper end of the lower section for guiding said arms to said upwardly and outwardly extending position when the upper section of said standard is moved relative to said lower section to extend said standard.

References Cited in the file of this patent

UNITED STATES PATENTS

| | | |
|---|---|---|
| 1,600,887 | Kimbrough | Sept. 21, 1926 |
| 1,922,626 | Marsh | Aug. 15, 1933 |
| 2,869,504 | Andrews | Jan. 20, 1959 |
| 2,887,983 | Budd | May 26, 1959 |

FOREIGN PATENTS

| | | |
|---|---|---|
| 15,020 | Great Britain | 1902 |